(12) United States Patent
Sazhin et al.

(10) Patent No.: US 7,596,762 B1
(45) Date of Patent: Sep. 29, 2009

(54) SYSTEM AND METHOD FOR INSTALLING IMAGE EDITING TOOLBARS IN STANDARD IMAGE VIEWERS

(75) Inventors: Victor V. Sazhin, Moscow (RU); Alexander V. Dyagilev, Moscow (RU)

(73) Assignee: Linerock Investments Ltd., Tortola (VG)

( * ) Notice: Subject to any disclaimer, the term of this patent is extended or adjusted under 35 U.S.C. 154(b) by 440 days.

(21) Appl. No.: 11/362,192

(22) Filed: Feb. 27, 2006

(51) Int. Cl.
*G06F 3/048* (2006.01)
(52) U.S. Cl. ........................ 715/835; 715/840
(58) Field of Classification Search ................ 715/723, 715/835, 840
See application file for complete search history.

(56) References Cited

U.S. PATENT DOCUMENTS

| | | | |
|---|---|---|---|
| 7,316,014 B2 * | 1/2008 | Cao | 717/169 |
| 2004/0125130 A1 * | 7/2004 | Flamini et al. | 345/738 |
| 2005/0259945 A1 * | 11/2005 | Splaver | 386/4 |

* cited by examiner

*Primary Examiner*—Boris Pesin
(74) *Attorney, Agent, or Firm*—Bardmesser Law Group

(57) ABSTRACT

A method, system and computer program product for modifying a standard Windows image viewer, including loading an image editing module into an address space of the standard image viewer that does not support plug-ins with added toolbars; integrating the image editing module into the standard image viewer; and displaying a toolbar of the image editing module to a user. The toolbar can include any of the following functions: red eye remover, color correction, caricature effects, lighting effects, retouching, re-sizing, cropping, removal of artifacts. An instance of the image editing module can be loaded for each instance of the standard image viewer. The image editing module maintains modality with the standard image viewer. A file name and file extension corresponding to an image being viewed can be displayed based on a file properties dialog window, or based on a current folder of the image being viewed. The standard Windows image editor can be forced to display the most current edited version of the image. The image editing module can maintain a scale factor of an edited image to correspond to a scale factor of an original image. The integrating step utilizes Windows hook mechanism.

19 Claims, 11 Drawing Sheets

SYSTEM AND METHOD FOR INSTALLING IMAGE EDITING TOOLBARS IN STANDARD IMAGE VIEWERS

BACKGROUND OF THE INVENTION

1. Field of the Invention

The present invention is related to image editing, and more particularly, to modifying standard operating system of viewers to work with image editing software.

2. Description of the Related Art

Most modern operating systems contain a standard set of applications for performing a variety of tasks. In the area of image displays, most operating systems, such as LINUX, Windows® (or any of its variants, e.g., XP, the upcoming Vista, etc.) include a default viewer so that a user can display image files on the screen. In the case of Microsoft Windows® XP, that viewer is usually known as Windows Picture and Fax Viewer (WPFV).

One of the disadvantages of standard OS viewers is that they lack the ability to add plug-in that enable a user to edit and manipulate images, particularly plug-ins that have an extra toolbar. For example, there are a number of products available that manipulate visual images and image files, such as JPEGs, bitmaps, PNG files, etc. However, these products are either stand-alone, or require that the viewer have plug-in capability, in order to work with them.

However, for a vendor of image editing software, it is generally preferable to allow the user to use familiar interface, to the extent possible, for editing the images. Thus, from a user's standpoint, the desirability of a software package that works "within" the standard viewer is higher than having to buy a standalone package, which the user then needs to learn. Accordingly, there is a need in the art to provide image editing functionality to standard OS viewer software, even where the standard viewer does not support plug-in additions and added toolbars.

SUMMARY OF THE INVENTION

Accordingly, the present invention is related to a system and method for adding image editing capability to standard viewers that substantially obviates one or more of the disadvantages of the related art.

In one aspect, there is provided a method, system and computer program product for modifying a standard Windows image viewer, including loading an image editing module into an address space of the standard image viewer that does not support plug-ins with added toolbars; integrating the image editing module into the standard image viewer; and displaying a toolbar of the image editing module to a user. The toolbar can include any of the following functions: red eye remover, color correction, caricature effects, lighting effects, retouching, re-sizing, cropping, removal of artifacts. An instance of the image editing module can be loaded for each instance of the standard image viewer. The image editing module maintains modality with the standard image viewer. A file name and file extension corresponding to an image being viewed can be displayed based on a file properties dialog window, or based on a current folder of the image being viewed. The standard Windows image editor can be forced to display the most current edited version of the image. The image editing module can maintain a scale factor of an edited image to correspond to a scale factor of an original image. The integrating step utilizes Windows hook mechanism.

In another aspect, a system for modifying a standard Windows image viewer running on a computer with a Windows operating system, the system includes an image editing module integrated into a standard image viewer that does not support plug-ins with added toolbars, with the image editing module located in an address space of the standard image viewer. A toolbar of the image editing module is displayed in the standard image editing module to a user.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 1 illustrates what the Microsoft Windows® standard viewer, Windows Picture and Fax Viewer, looks like.

DETAILED DESCRIPTION OF THE PREFERRED EMBODIMENTS

Reference will now be made in detail to the preferred embodiments of the present invention, examples of which are illustrated in the accompanying drawings.

Figure 1:
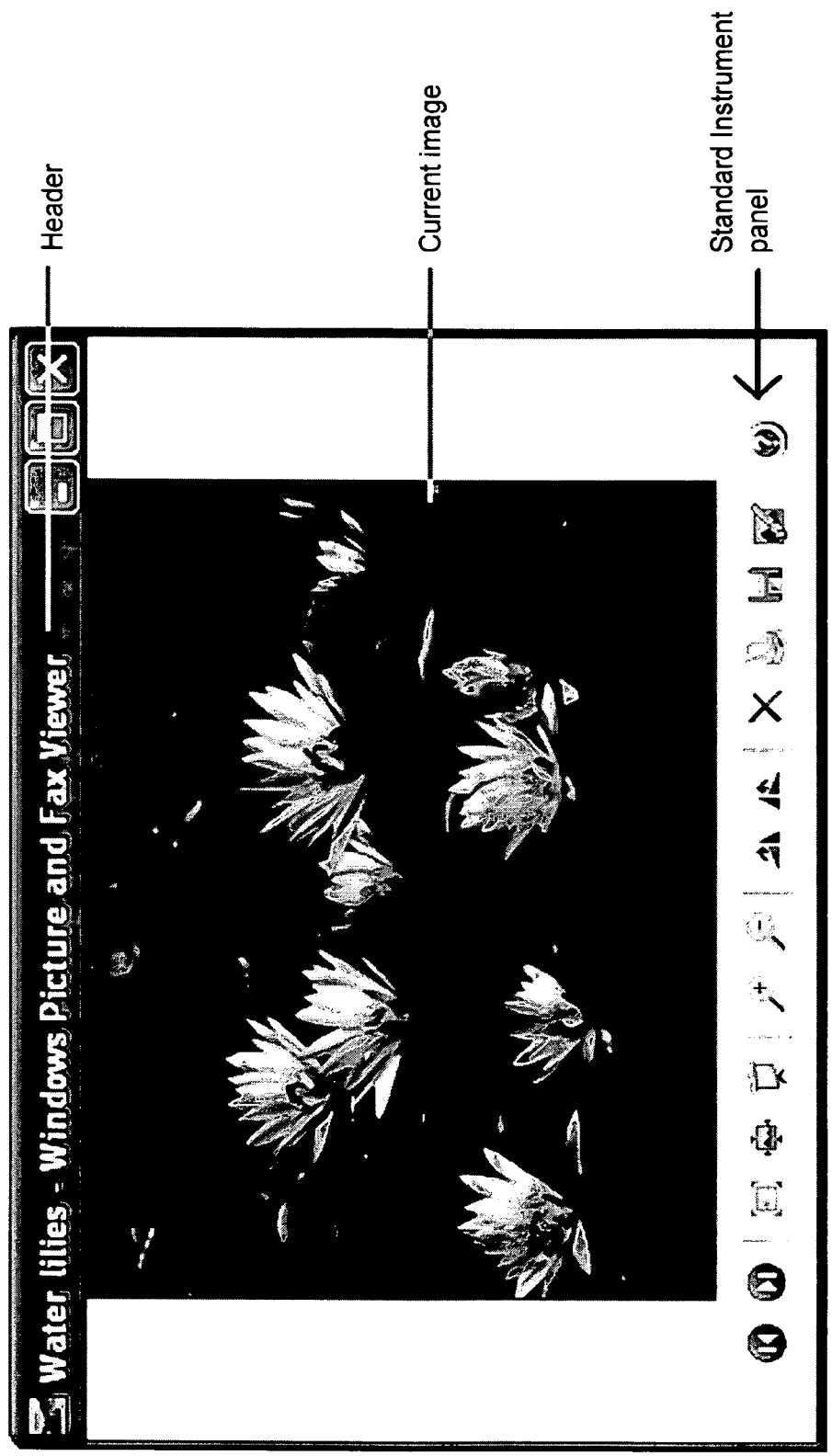

FIG. 1 illustrates what the Microsoft Windows® standard viewer, Windows Picture and Fax Viewer (WPVF), which is used as an example in this discussion, looks like. Other OS standard image viewers and managers, e.g., the standard viewer in Microsoft Windows Vista (or a viewer such as Windows Photo Gallery) are also intended to be covered by this description. As shown in FIG. 1, the WPVF main window has a header area, an area where the current image is displayed, and an instrument panel that allows the user some modest image manipulation capabilities, such as image rotation, zoom in, zoom out, printing, etc. In addition to these relatively simple functions, many users would like to be able to edit the images. For example, such editing might include red eye remover, color correction, caricature effects, lighting effects, retouching, resizing, cropping, removal of artifacts, etc.

Figure 2:
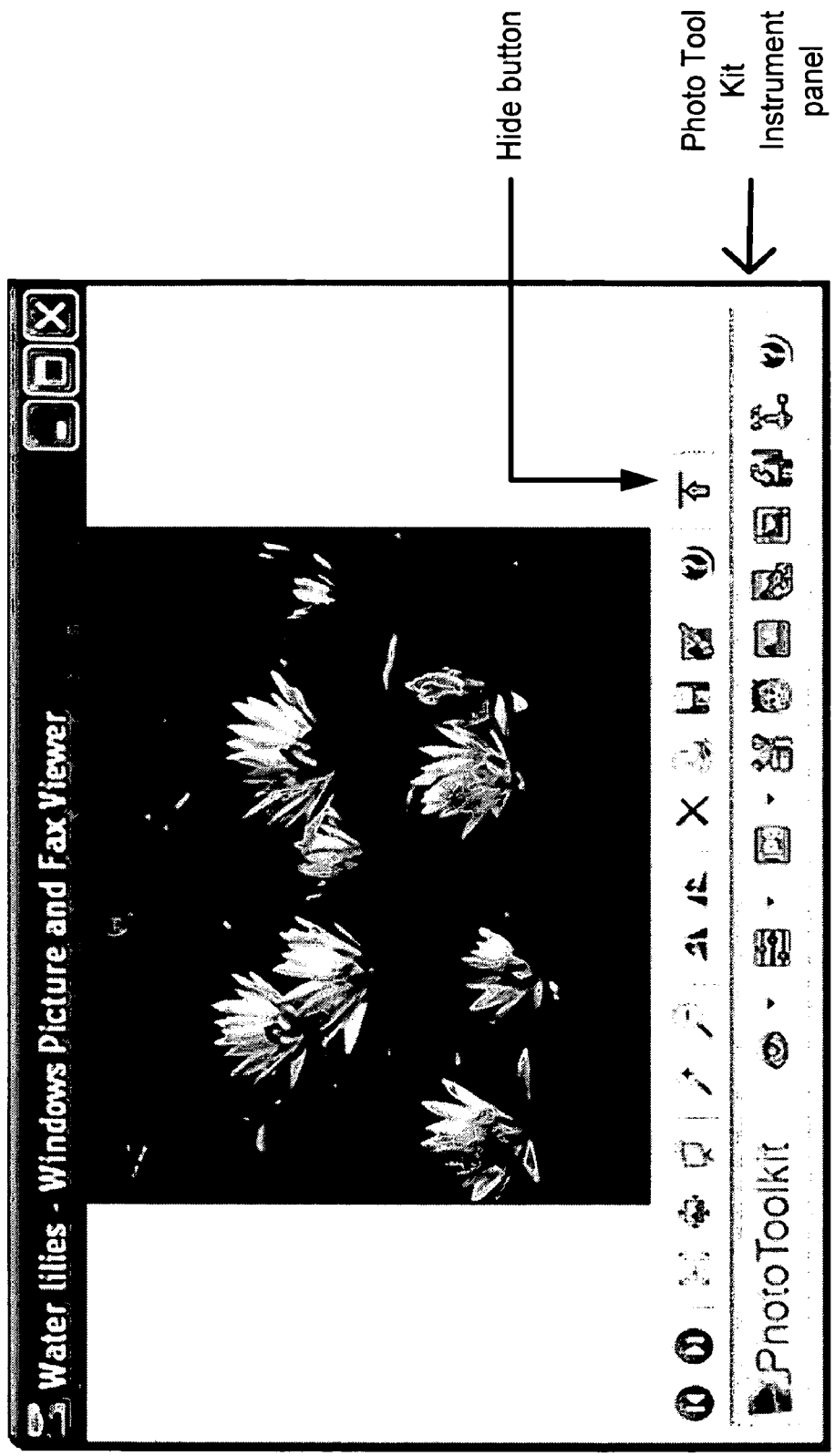
FIG. 2 illustrates the addition of a toolbar to Windows Picture and Fax Viewer.

At minimum, to enable additional functionality, the standard viewer, whether for the versions available in 2006, or for any future versions, such as Windows Vista, etc., needs to have additional buttons added, for the user interface. This is illustrated in FIG. 2. Additionally, other functionality needs to be added to the viewer, that is not necessarily visible to the user, but is needed to enable the required functionality due to the absence of a plug-in interface in WPFV.

Furthermore, it is desirable to have the option to hide the added buttons, so that the user can return to the standard browser viewer interface that he is used to. Although the toolbar in FIG. 2 is shown at the bottom of the screen, one skilled in the art will readily appreciate that the toolbar can be positioned elsewhere in the window as well, for example, at the top, on the side, or even be displayed dynamically, for example, when the user presses some key.

Figure 3:
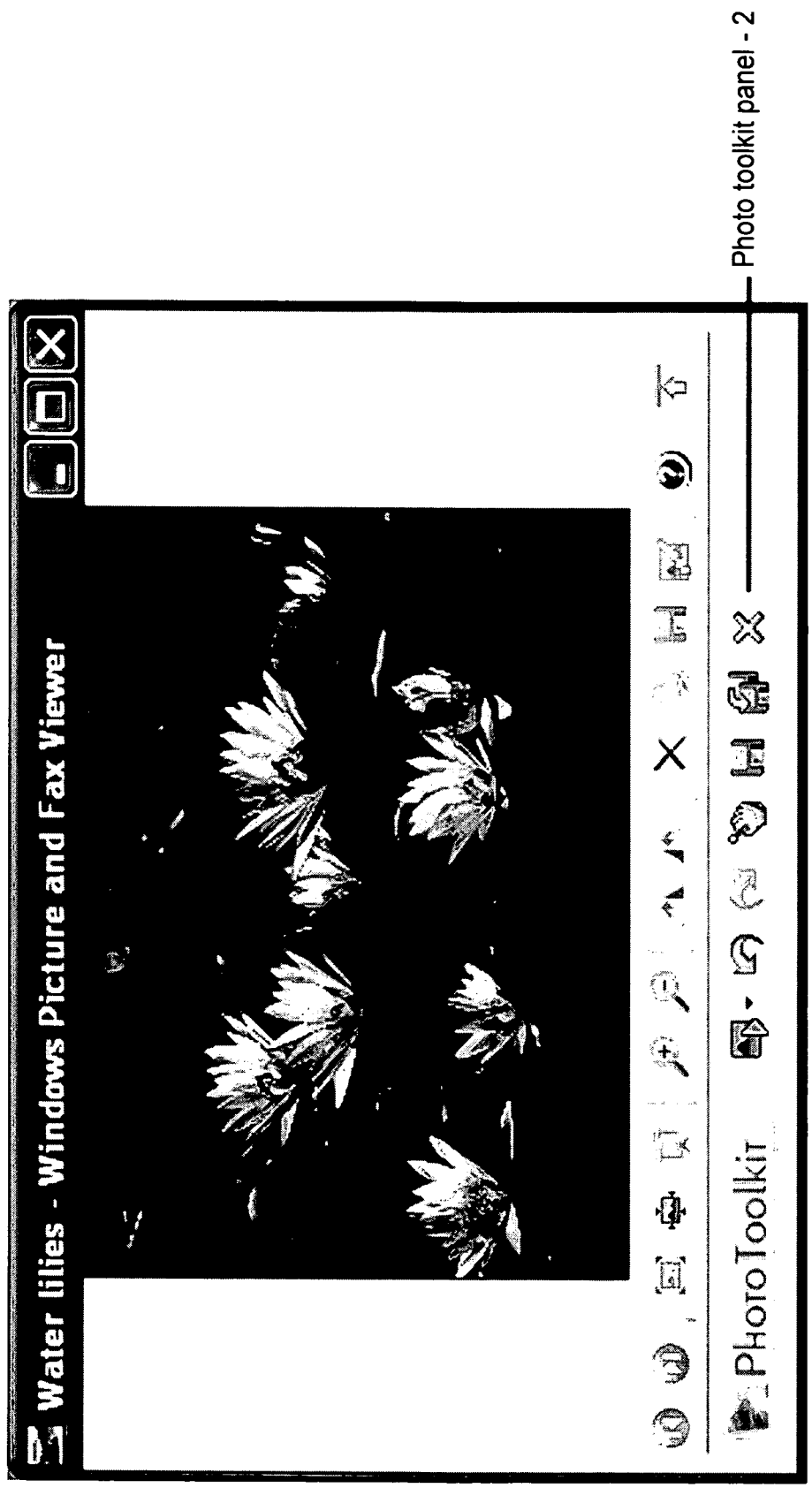
FIG. 3 shows how the image that is being edited replaces the original image in Windows Picture and Fax Viewer.

When the image editing functionality is called by the user, an appropriate image processing module is then activated, and the results of the processing are displayed on the screen. Optionally, the user can have the ability to replace the original image on the screen, retain the original image on the screen under a different name, cancel the edits to the image, display both the original image and the edited image simultaneously, etc. This is illustrated in FIG. 3. Thus, the task of incorporating additional functionality into the standard viewer includes:

(a) Integration of the toolkit into the standard viewer;

(b) Attaching to the main window of the viewer, in order to intercept the messages between the operating system and the viewer window;

(c) Modification of the instrument panel of the viewer.

Generally, when the above aspects are implemented, the algorithm for doing so is broken up into a number of specific tasks, which typically need to be done during the execution of the program. For example, these tasks include:

1. Identifying the name of the file of the current image that is being displayed;

2. Refreshing the current image when the image is modified or edited;

3. Displaying the edited image in the viewer's main image window, including an optional ability to display both the edited image and the original image, and optionally synchronizing the scale of the edited image and the original image (i.e., synchronizing the zoom factor);

4. Don't allow the user to do something in the viewer window until he has finished the editing of the image. This forces the image editing window to be active if the user is attempting to activate the viewer window.

The algorithm of integrating the additional functionality into the standard viewer uses, for example, the mechanism of hooks in Microsoft Windows®. A "hook" refers to code that implements the changed code, such as new function calls that replace the original function calls in WPFV. Usually the hook is added in the process of patching or installing the new code, such as the Photo Toolkit, but it can also be present already, and activated later.

Using the hook mechanism of Windows® permits integrating the Photo Toolkit code into the code of another process, such that the Photo Toolkit code is called when certain events occur. The Photo Toolkit code is preferably provided as a separate module, and is loaded by the operating system into all system processes that have a user interface. Once a certain event happens, for example, a message from the system to the viewer window, the Photo Toolkit module then determines whether this process is the process that it is interested in, in other words, a standard viewer such as WPFV, or the standard viewer in the future versions of Windows®. If the calling program is not a standard viewer, then the module does nothing, allowing the operating system and whatever module was calling it to act "normally." If it is a standard viewer, such as WPFV, then it is required to do all the remaining tasks related to the integration into a viewer.

This can be done in parallel with the operation of WPFV itself, for example, by using a separate thread, or a similar mechanism. This also helps avoid possible problems, such as the WPFV "hanging up" or slowing down of the start of the WPFV itself, etc.

In one embodiment, for each instance of the viewer, a separate instance of the Photo Toolkit module is launched. Once launched, the Photo Toolkit module then calls the panel integration function. This function has the following tasks:

1. Find the main window of WPFV;

2. Call the function of attaching to this window;

3. The attaching function then checks whether the Photo Toolkit panel is already installed in the viewer window. If it is, then no further work needs to be done. Otherwise, using standard Windows® API mechanisms, the function replaces the current instrument panel with the Photo Toolkit instrument panel. This is illustrated in FIG. 4.

Figure 4:
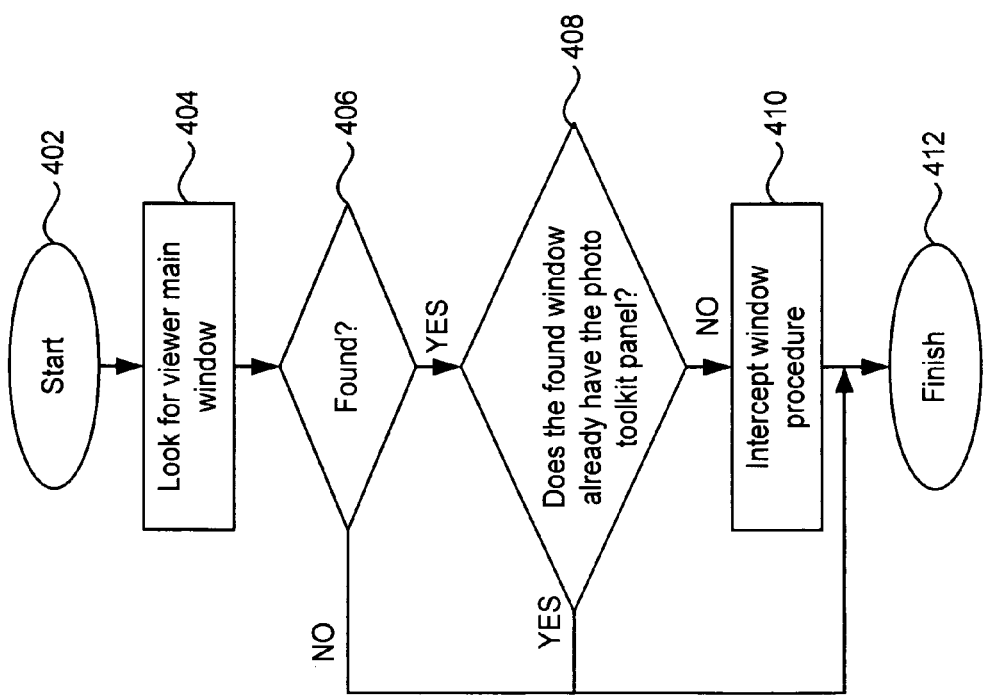
FIG. 4 illustrates the algorithm of attaching to the main window of Windows Picture and Fax Viewer.

As shown in FIG. 4, once the process is started (step 402), in step 404, the process looks for the viewer's main window. If no such main window is found, then the process terminates in step 412. If the main window is found, then, in step 408, the process checks whether the instance of the viewer that it found already has the Photo Toolkit instrument panel. If it does, then the process terminates in step 412, otherwise, the window procedure is intercepted in step 410 and the process terminates in step 412. In other words, each window in Microsoft Windows® has its own service callback function that is called then an event occur. Intercepting the window procedure means that Windows® will call a specified callback procedure instead of the original callback procedure. The specified callback procedure will then call original procedure.

As noted earlier, the instrument panel of the standard viewer needs to be modified as well, to provide the user an interface for the added functionality. One of the decisions that needs to be made is related to the appearance of the window and the additional toolbar. This is generally viewer-specific. For example, the added toolbar can be placed at the bottom of the window, at the sides of the window, at the top, etc. It can be integrated into the original toolbar, for example, by stretching it, by somewhat shrinking the original buttons in size, by providing a dynamic pop-up toolbar, etc. As yet a further option, FIG. 3, discussed above, illustrates how the added toolbar can be displayed, including a button for hiding it.

Figure 5:
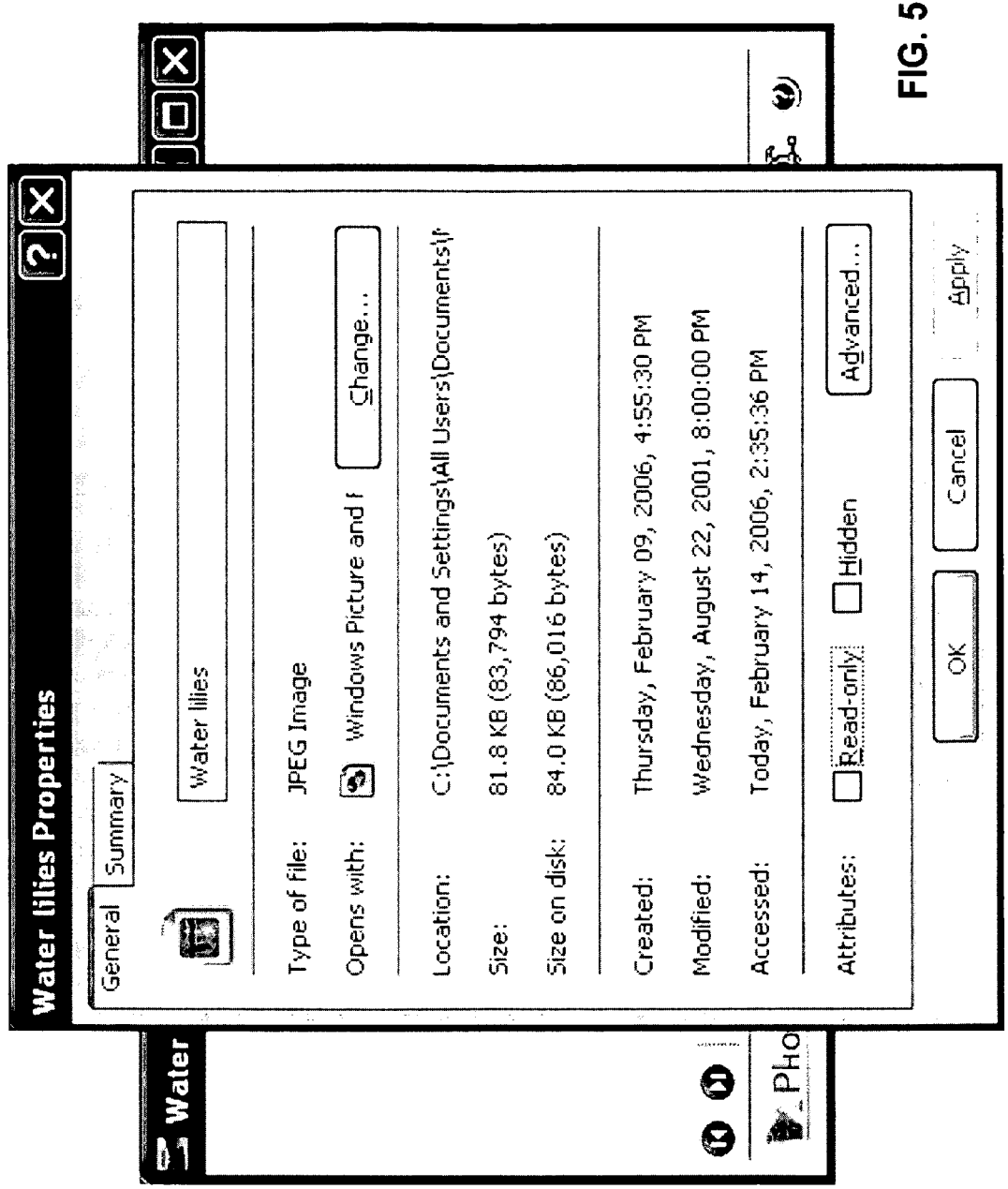
FIG. 5 illustrates how WPFV functions can be used to derive the file name of the image being displayed.

One of the difficulties of working with the Windows® standard viewer, WPFV, is that WPFV does not have a mechanism for providing a file name of the image that is currently being displayed. To address this problem, in one embodiment of the invention, the following approach has been implemented. In response to a user request, WPFV can show a window on the screen that displays the properties of the file, as shown in FIG. 5. FIG. 5 illustrates that the newly opened window contains all the information necessary to generate the file name. In order to actually generate the file name, it is therefore possible to imitate the opening of the dialog window of FIG. 5 by the user, wait for its appearance, and, upon receipt of the information from the window, close it. Therefore, the algorithm for identifying the file name is generally as follows (see also FIG. 6):

1. After starting (602), inside WPFV, a hook is installed (step 604), within which the algorithm awaits the moment of creation and initialization of the file properties dialog window. This algorithm can have a relatively simple check of the call, whether this call is meant to initiate the dialog. Once the dialog initialization event is received, this indicates that the dialog window is open and is populated with information, but is not yet displayed.

2. The algorithm then imitates an action by the user to display the file properties window (606). This is implemented by sending a standard Windows® call to main window of WPFV with a function parameter (identifier) that corresponds to the parameter to open the dialog window shown in FIG. 5.

3. The algorithm then awaits the initiation of the dialog window shown in FIG. 5 (step 608).

4. Since the message regarding the initiation of the dialog window can come from several windows, due to the properties of the dialog window, it is necessary to identify the message from the "General" tab, or from the "Summary" tab (610). To do this, a procedure that checks the parent window of the message can be used. If the parent dialog window has an identifier "32770" then this is the dialog window the algorithm is looking for. Otherwise, the procedure waits for a message from the proper dialog window.

5. The "General" tab is of interest, and this tab is made the main tab, and its identifier is received (612). If receiving the identifier is not possible, that means the dialog window has not been initiated yet (614).

6. Using standard OS functions that work with dialog windows, the file name (here, "Water Lilies"), file path (here, "D:\Documents and Settings\ . . . "), and file size (here, 81.8 KB, or 83,794 bytes) can be received (616). The file size is of interest because the "General" tab contains no information about the extension of the file (but only its user-friendly name). If the folder has several files with the same name, but with different extensions, the file will be identified by both the name and file size.

7. The dialog window can then be closed (618).

The algorithm described above can, at times, be somewhat slow, primarily because the dialog window that shows the file properties is called by the WPFV with some delay. To address this problem, the following modification can be implemented. The modification is based on the fact that WPFV shows the file name in the header of the main window, and, therefore, most of the time there will not be a need to call the window that shows file properties. The algorithm for this can be as follows:

1. The algorithm checks whether the current working folder of images is known. The folder will be stored in a known place, and, if it is not known, then the current folder can be identified using a standard Windows® function call.

2. The file name of the image is then derived from the title of the viewer window.

3. The algorithm then checks that the file with that name is actually present on the disk. If there is no such file, then this indicates that the folder is unknown, and it is different from what has been identified by the standard Windows® function call. In that case, the algorithm described above with reference to FIG. 6 needs to be used. Once that algorithm has been run, the current working folder derived by it is stored for the further use by this algorithm.

4. If the file with that name does exist on the hard disk drive, then the number of files needs to be checked. If there are several files with the same name, then, again, the standard method shown in FIG. 6 needs to be used. If only one file is found, then, knowing the folder, the file name, and file extension, the entire file identifier can then be displayed.

Figure 7:
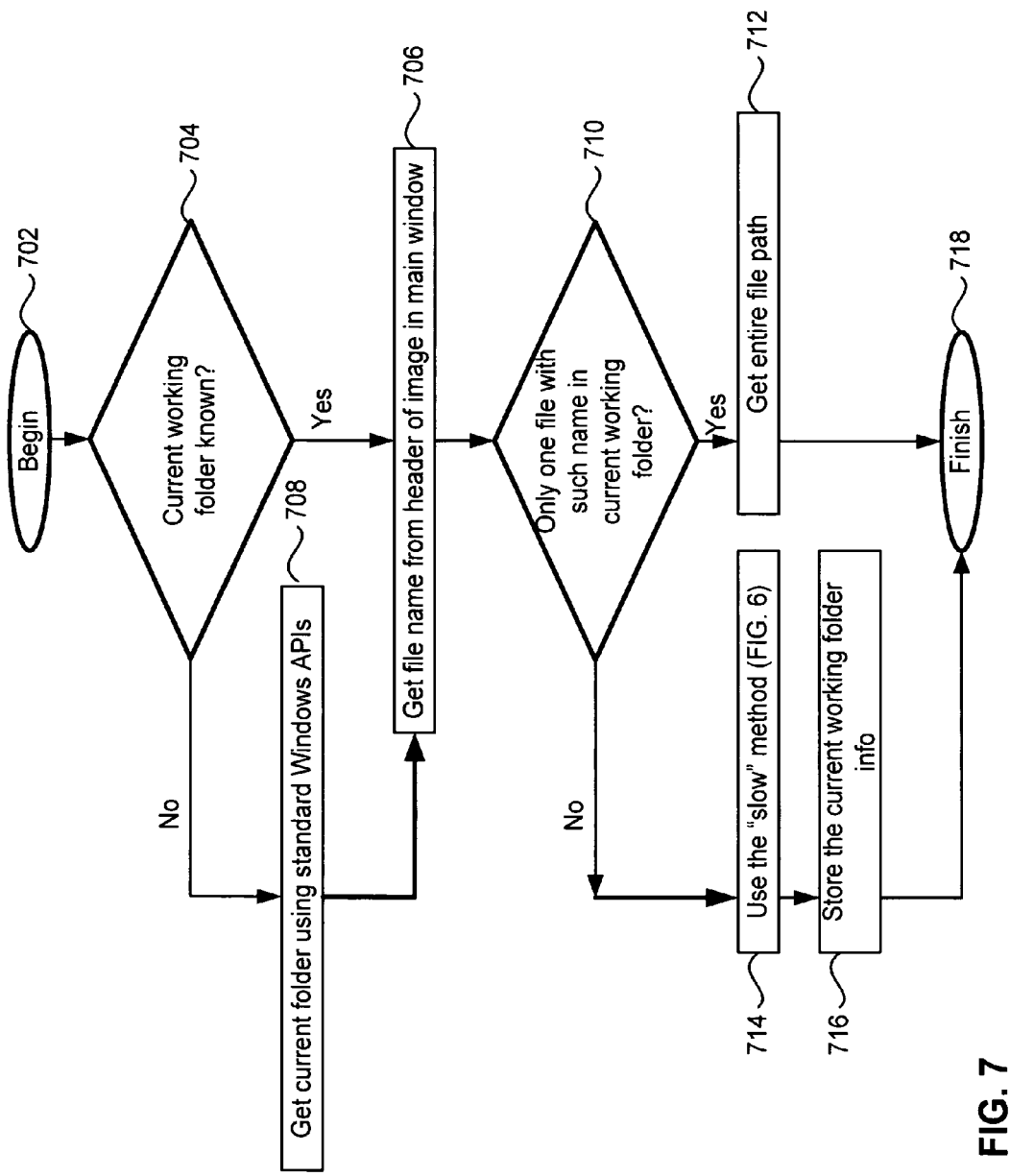
FIG. 7 illustrates the accelerated algorithm for deriving the file name that corresponds to the image being displayed.

FIG. 7 illustrates the accelerated algorithm for deriving the file name that corresponds to the image being displayed. As shown in FIG. 7, after the algorithm starts in step 702, in step 704, the algorithm checks whether the current working folder is known. If the current working folder is unknown, then, in step 708, the current working folder is identified using standard Windows® APIs. Then the file name is derived from the header of the currently open main window (step 706).

If, in step 704, the current folder is known, then the file name is derived from the header of the currently open main window (step 706). The algorithm then checks whether the current folder has only one file with that name (step 710). If there is more than one name, or there are no files with that name found, then the algorithm proceeds to step 714. If there is only one name, then the entire file name and file path can be derived from the folder (step 712). The process then terminates in step 718.

Figure 6:
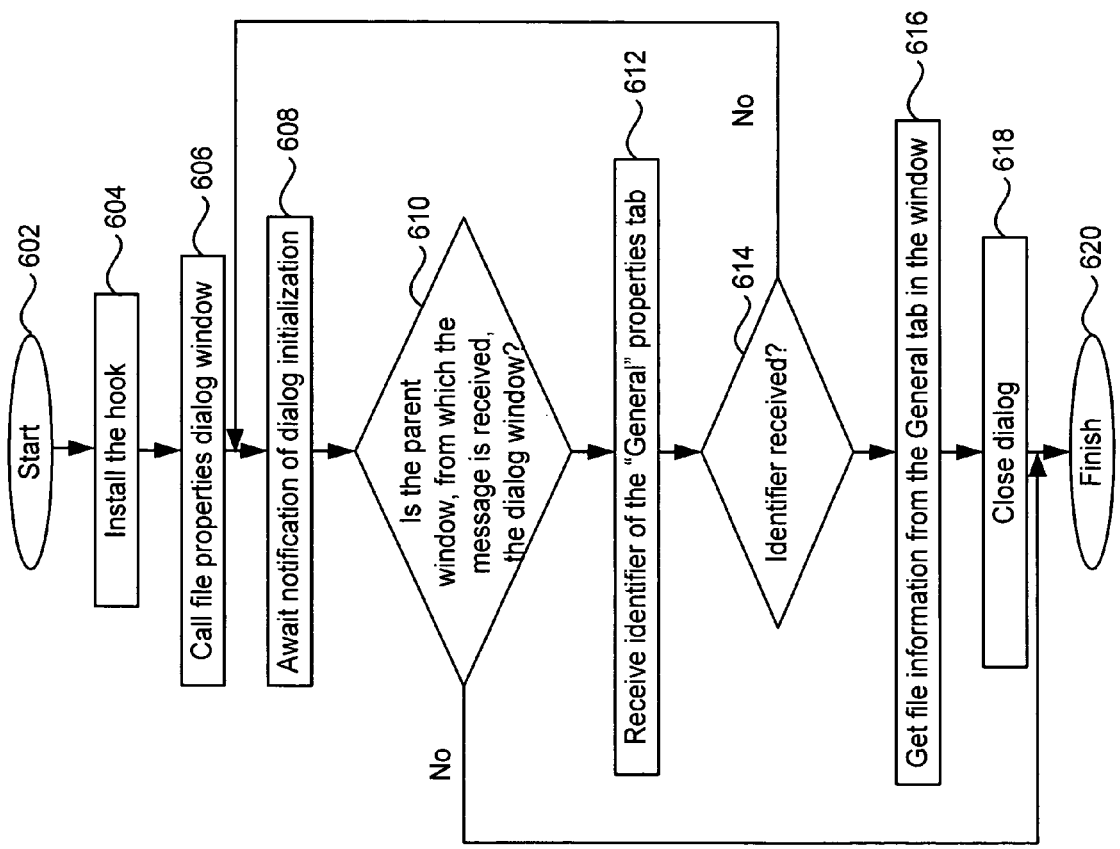
FIG. 6 illustrates the algorithm of deriving file name and file type of the image file using standard Windows® APIs.

In step 714, the "slow" method is used, as illustrated in FIG. 6. Then, in step 716, the name of the current folder is stored, and the process then terminates in step 718.

It should be noted that as a practical matter, the situation where there are multiple files that have the same name but different file types (i.e., WaterLilies.jpg, WaterLilies.bmp, WaterLilies.tif, etc.) is relatively rare, most of the time, it is expected that the accelerated algorithm shown in FIG. 7 can be used.

Figure 8:
FIG. 8 and FIG. 9 illustrate refreshing the current image when that image has been edited.

Another issue that needs to be addressed is refreshing the current image when that image has been edited. WPFV does not have a standard mechanism for doing that. To address this issue, the following algorithm is proposed, and is illustrated in the screen shot of FIG. 8 and the flow chart of FIG. 9.

Figure 9:
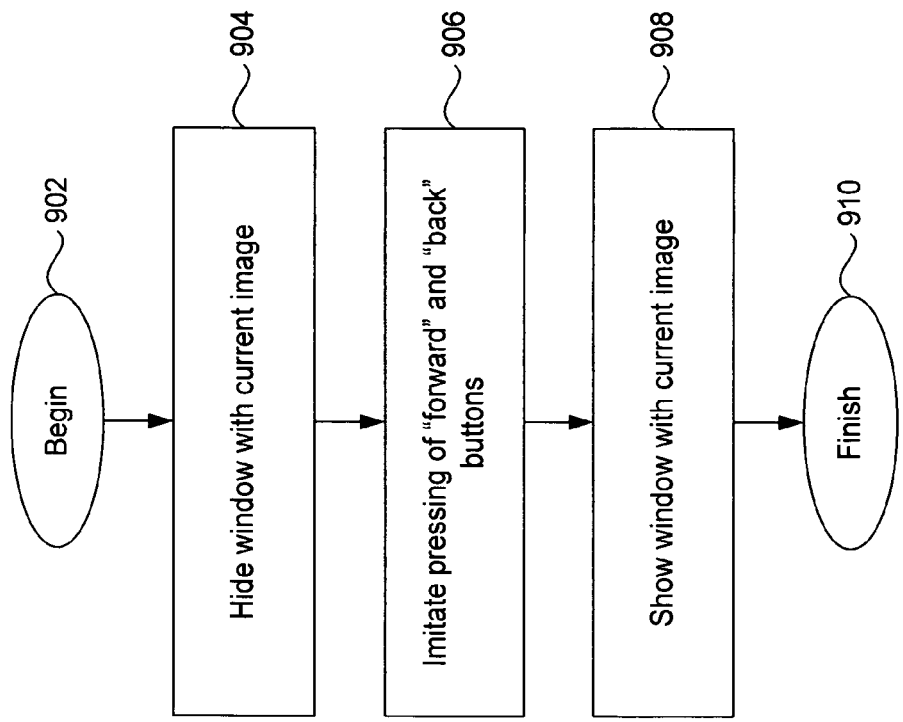

As shown in FIG. 9, after starting the algorithm in step 902, in step 904, the window with the current image is hidden (step 904). This is done in order for the user to avoid seeing a "blinking" of the image on the screen due to the execution of the steps discussed further below. Note that despite the hiding of the window, the image itself does not disappear; it merely is no longer refreshed. In step 906, the algorithm imitates the actions by the user, when the user presses the "Forward" and "Back" buttons on the WPFV standard toolbar. This forces WPFV to refresh the image of the edited picture. In step 908, the algorithm shows the window with the current image, and the user now sees the edited image in the main window. The algorithm ends in step 910.

To display the results of the image editing, a special window is opened, such that the window fulfills the functions analogous to the WPFV main display window. In other words, this window shows the image, and scales the image appropriately. The other window that shows the current image is temporarily hidden. Since these windows appear identical, the user will not notice any difference.

Additionally, the Photo Toolkit gives the user the option of comparing the edited image with the original image. This can be done by loading, into the new main window, the original image. Switching between the windows can be done, for example, using the right mouse button, which is convenient for the user.

Another aspect that needs to be addressed is the scaling, or zoom factor, of the image. WPFV provides a number of different scale factors that the user can employ—for example, scale to window size, scale to actual size, scale to some specified zoom factor. Accordingly, the edited image needs to be displayed to the same scale factor as that used in the original WPFV image. Furthermore, not only does the scale factor needs to be synchronized, but also the current position of the image, if the image is larger than the window used to display it.

In order to accomplish this, the following algorithm can be implemented:

Old commands that control the current scale factor of the image are transferred to the window with the current picture. That window continues to process those commands, as before, upon receipt, even though that window is hidden. When the command is processed by the window, the algorithm can synchronize the scale of the image in the window that shows the edited image with the scale of the original image.

The synchronization itself is done based on the state of the buttons on the instrument panel and the parameters of the scroll bars of the current image. This can be done as follows:

If the button "best fit" is inaccessible, then the window that shows the edited image uses the same scale factor.

If the "best fit" button is accessible, then the algorithm checks the state of the "actual image size" button. If that button is inaccessible, then the scale factor is set to one for the window that shows the edited image as well.

If that button is also accessible, that means that the user has set the size by using the zoom in/zoom out buttons. The image scale can be derived based on the state of the scroll bars. The parameter maximum position is indicative of the required zoom factor of the image (for example, for an image size 200 pixels, with a scale factor of 2, the necessary image size will be 400 pixels), while the parameter "current position" is indicative of the current images upper left most XY coordinate. The height and length of the image corresponds to the horizontal and vertical scroll bars.

If the user changes the position of the view area of image, then the parameter "current position" of the image editing window's scrollbars is synchronized with the appropriate parameters of the current image window (that belongs to WPFV) as well.

Figure 10:
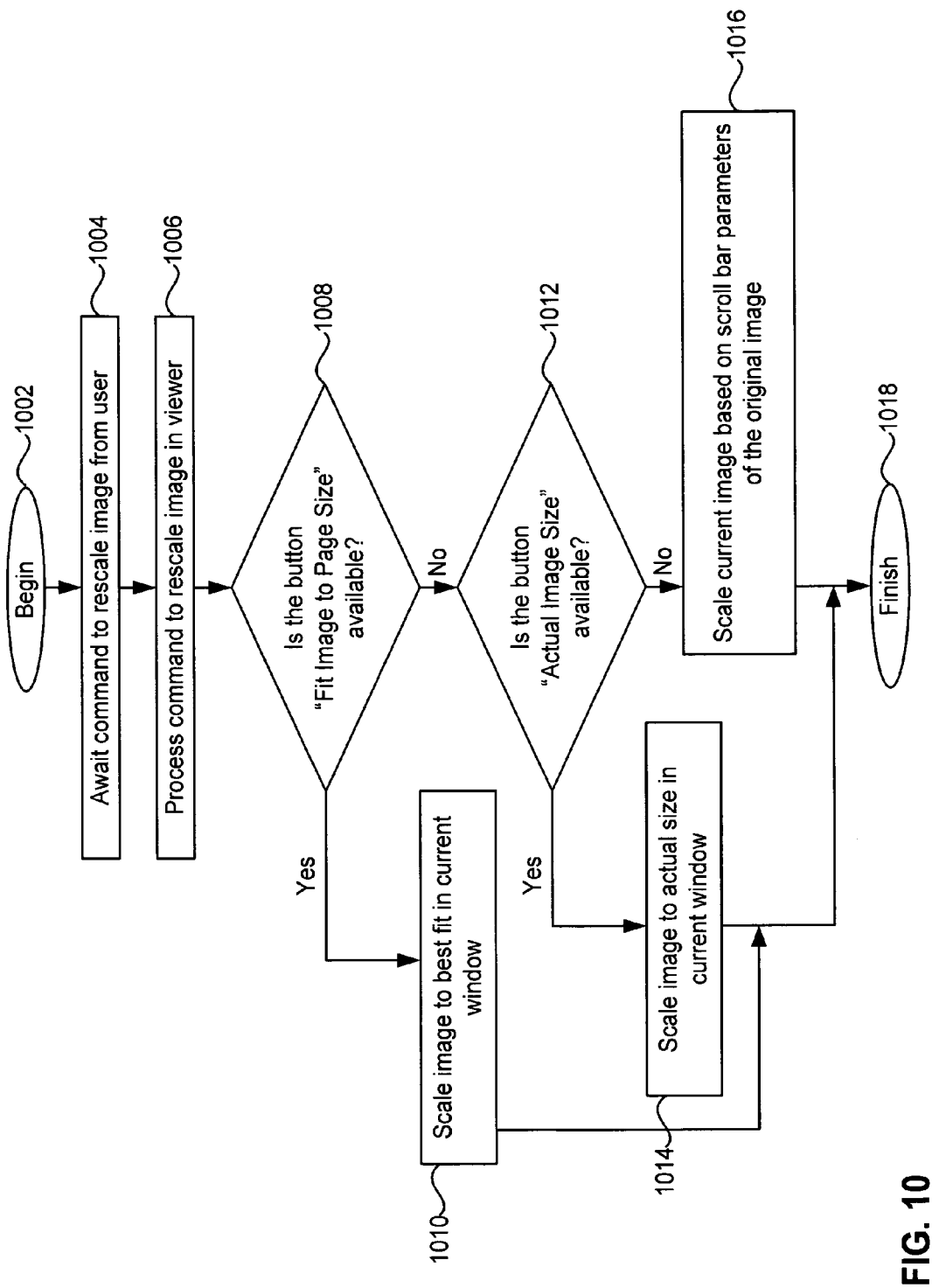
FIG. 10 illustrates the image scaling synchronization algorithm.

FIG. 10 illustrates the scaling algorithm in flowchart form. As shown in FIG. 10, once the algorithm begins in step 1002, the algorithm awaits the "change zoom" command from the user (step 1004). The command is then processed using the means available in the WPFV (step 1006). The algorithm then checks whether the button "best fit" is inaccessible (step 1008). If it is, then, in step 1010, the current window is set to the scale factor (step 1010), and the process ends in step 1018. If, in step 1008, the "best fit" button is available, then, in step 1012, the algorithm checks whether the button "actual image size" is inaccessible. If it is, then in step 1014 the same scale factor is applied to the current image. If it is not, then the scale factor is set based on the parameters of the original image (step 1016) and the process terminates in step 1018.

Additionally, it is preferable that the principle of modality be preserved. This means that while the Photo Toolkit is performing some dialog-based function (e.g., red-eye removal), that the WPFV wait for the dialog window to be closed, before doing anything else. In other words, the added Photo Toolkit functions behave the same way as the standards WPFV functions. This is done by calling the window activation function when receiving the standard message of setting the input focus and message of drawing the main window's title.

Figure 11:
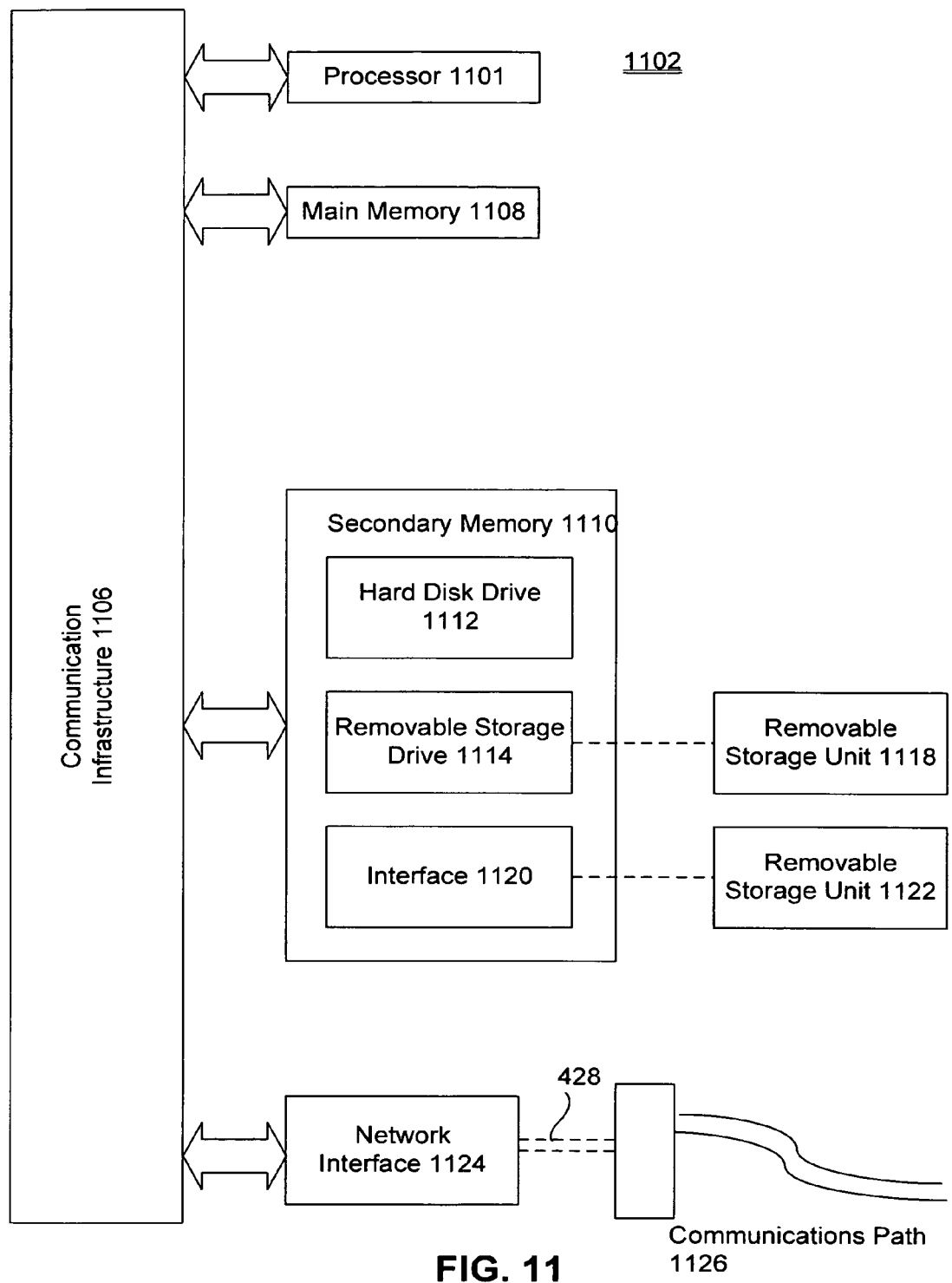
FIG. 11 illustrates an exemplary computer system of which the invention may be implemented.

An example of the computing system 1102 on which the technology described above can be implemented is illustrated in FIG. 11. The computing system 1102 includes one or more processors, such as processor 1101. The processor 1101 is connected to a communication infrastructure 1106, such as a bus or network. Various software implementations are described in terms of this exemplary computer system. After reading this description, it will become apparent to a person skilled in the relevant art how to implement the invention using other computer systems and/or computer architectures.

Computing system 1102 also includes a main memory 1108, preferably random access memory (RAM), and may also include a secondary memory 1110. The secondary memory 1110 may include, for example, a hard disk drive 1112 and/or a removable storage drive 1114, representing a magnetic tape drive, an optical disk drive, etc. The removable storage drive 1114 reads from and/or writes to a removable storage unit 1118 in a well known manner. Removable storage unit 1118 represents a magnetic tape, optical disk, or other storage medium that is READ by and written to by removable storage drive 1114. As will be appreciated, the removable storage unit 1118 can include a computer usable storage medium having stored therein computer software and/or data.

In alternative implementations, secondary memory 1110 may include other means for allowing computer programs or other instructions to be loaded into computing system 1102. Such means may include, for example, a removable storage unit 1122 and an interface 1120. An example of such means may include a removable memory chip (such as an EPROM, or PROM) and associated socket, or other removable storage units 1122 and interfaces 1120 which allow software and data to be transferred from the removable storage unit 1122 to computing system 1102.

Computing system 1102 may also include one or more communications interfaces, such as communications interface 1124. Communications interface 1124 allows software and data to be transferred between computing system 1102 and external devices. Examples of communications interface 1124 may include a modem, a network interface (such as an Ethernet card), a communications port, a PCMCIA slot and card, etc. Software and data transferred via communications interface 1124 are in the form of signals 1128 which may be electronic, electromagnetic, optical or other signals capable of being received by communications interface 1124. These signals 1128 are provided to communications interface 1124 via a communications path (i.e., channel) 1126. This channel 1126 carries signals 1128 and may be implemented using wire or cable, fiber optics, an RF link and other communications channels. In an embodiment of the invention, signals 1128 comprise data packets sent to processor 1101. Information representing processed packets can also be sent in the form of signals 1128 from processor 1101 through communications path 1126.

The terms "computer program medium" and "computer usable medium" are used to generally refer to media such as removable storage units 1118 and 1122, a hard disk installed in hard disk drive 1112, and signals 1128, which provide software to the computing system 1102.

Computer programs are stored in main memory 1108 and/or secondary memory 1110. Computer programs may also be received via communications interface 1124. Such computer programs, when executed, enable the computing system 1102 to implement the present invention as discussed herein. In particular, the computer programs, when executed, enable the processor 1101 to implement the present invention. Where the invention is implemented using software, the software may be stored in a computer program product and loaded into computing system 1102 using removable storage drive 1114, hard drive 1112 or communications interface 1124.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of modifying a standard operating system image viewer, the method comprising:
   loading an image editing module into an address space of the standard image viewer that does not support plug-ins with added toolbars and that is installed together with operating system installation;
   integrating the image editing module into the standard image viewer; and
   in a window of the standard image viewer, displaying a toolbar of the added image editing module to a user.

2. The method of claim 1, wherein the toolbar includes any of the following functions: red eye remover, color correction, caricature effects, lighting effects, retouching, resizing, cropping, removal of artifacts.

3. The method of claim 1, further comprising loading an instance of the image editing module for each instance of the standard image viewer.

4. The method of claim 1, wherein the image editing module maintains modality with the standard image viewer.

5. The method of claim 1, further comprising displaying a file name and file extension corresponding to an image being viewed, the file name and file extension extracted from a file properties dialog window of the standard image viewer.

6. The method of claim 1, further comprising displaying a file name and file extension corresponding to an image being viewed, based on a current folder of the image being viewed.

7. The method of claim 1, further comprising forcing the standard operating system image editor to display the most current edited version of the image.

8. The method of claim 1, wherein the image editing module maintains a scale factor of an edited image to correspond to a scale factor of an original image.

9. The method of claim 1, wherein the integrating step utilizes the operating system's hook mechanism.

10. A system for modifying a standard operating system image viewer running on a computer with an operating system, the system comprising:
    a processor;
    a memory operatively coupled to the processor;
    computer code loaded into the memory for performing the functions of:
    an image editing module integrated into a standard image viewer that does not support plug-ins with added toolbars and that is installed together with operating system installation, the image editing module located in an address space of the standard image viewer; and
    a toolbar of the added image editing module displayed in a window of the standard image editing module to a user.

11. The system of claim 10, wherein the toolbar includes any of the following functions: red eye remover, color correction, caricature effects, lighting effects, retouching, resizing, cropping, removal of artifacts.

12. The system of claim 10, further comprising loading an instance of the image editing module for each instance of the standard image viewer.

13. The system of claim 10, wherein the image editing module maintains modality with the standard image viewer.

14. The system of claim 10, further comprising displaying a file name and file extension corresponding to an image being viewed, the file name and file extension extracted from a file properties dialog window of the standard image viewer.

15. The system of claim 10, further comprising displaying a file name and file extension corresponding to an image being viewed, based on a current folder of the image being viewed.

16. The system of claim 10, further comprising forcing the standard image editor to display the most current edited version of the image.

17. The system of claim 10, wherein the image editing module maintains a scale factor of an edited image to correspond to a scale factor of an original image.

18. A computer program product for modifying a standard operating system image viewer, the computer program product comprising a computer useable storage medium having computer program logic recorded thereon for controlling a processor, the computer program logic comprising:
    computer program code means for loading an image editing module into an address space of the standard image viewer that does not support plug-ins with added toolbars and that is installed together with operating system installation;
    computer program code means for integrating the image editing module into the standard image viewer; and
    computer program code means for displaying a toolbar of the added image editing module in a window of the standard image viewer to a user.

19. The method of claim 1, wherein the toolbar includes any of the following functions: caricature effects, retouching, resizing, cropping, removal of artifacts.

* * * * *